United States Patent [19]
Andreasen

[11] 3,710,410
[45] Jan. 16, 1973

[54] DIE ACTUATOR
[75] Inventor: Alfred C. Andreasen, Oak Park, Ill. 60302
[73] Assignee: New Way Products Company, Franklin Park, Ill.
[22] Filed: Sept. 7, 1971
[21] Appl. No.: 178,285

[52] U.S. Cl............................10/89 R, 10/111, 10/97, 82/24 A
[51] Int. Cl............B23g 1/02, B23g 1/44, B23g 5/12
[58] Field of Search........10/89 R, 89 H, 96, 97, 111, 10/120, 120.5, 121, 123; 82/24 A; 90/11.4; 408/142, 148, 149

[56] References Cited
UNITED STATES PATENTS

| R23,684 | 7/1953 | Benninghoff et al............10/120.5 R |
| 547,664 | 10/1895 | Crudginton..........................10/89 R |
| 1,013,212 | 1/1912 | Neckerman..........................10/89 R |
| 1,762,988 | 6/1930 | Hogg....................................10/89 R |
| 2,825,913 | 3/1958 | Hercik...............................10/120.5 R |

Primary Examiner—Richard J. Herbst
Assistant Examiner—E. M. Combs
Attorney—Mason, Kolehmainen, Rathburn & Wyss

[57] ABSTRACT

A die actuator for moving an operating lever of a threading die on automatic screw machines, and the like, having a turrethead indexable through a plurality of different work positions and slidable along a work axis toward and away from the workpiece. The die actuator comprises a base which is fixedly secured to the bed of the automatic screw machine and defines vertical guide means. An actuator slide is mounted for vertical sliding movement on the base in said guide means between an elevated, upper position and lower, rest position. Lift means extends outwardly of the slide into the path of travel of the operating lever on the threading die as the die moves during indexing of the turret. ENgagement between the lift means and the die operating lever during turret indexing causes the lever to close the die and move the thread chasers into position ready for cutting threads on a workpiece. When the head is subsequently moved forward toward the workpiece, the operating lever moves out from under said lift means and the actuator slide drops downwardly to the rest position out of the way of the turrethead and any of the other tools mounted thereon.

6 Claims, 9 Drawing Figures

INVENTOR
ALFRED C. ANDREASEN
BY Mason, Kolehmainen, Rathburn and Wyss
ATTORNEYS

DIE ACTUATOR

The present invention relates to a new and improved die actuator for actuating the operating lever of a threading die mounted on an automatic screw machine or the like. More particularly, the die actuator of the invention is especially adapted for use in closing automatic, self-opening, threading dies used on threading automatic screw machines. Automatic screw machines normally employ turretheads supporting a plurality of different tools thereon and indexable to align successive tools in a work position.

It is desirable and an object of the invention to provide an automatic die actuator for use in closing the thread chasers in a self-opening threading die prior to indexing the die into a work position ready for thread cutting on an automatic screw machine.

Moreover, it is desirable and an object of the present invention to provide a threading die actuator which is capable of rapid action to close the die with a minimum of force or impact exerted between the die and actuator so that a long, useful life is possible even with high production rates.

In prior art arrangements, die actuators for closing threading dies have generally utilized springs or springlike members which were deflected out of the normal position during die actuation. Oftentimes, after a surprisingly small number of cycles of operation, the springs fatigued and failed, requiring costly down-time to replace, and many times causing damage to the threading die or machine. Moreover, the spring-type actuator often interfered with other tools on the turrethead of an automatic screw machine during indexing of the head. Some of the failures were due to high impact forces during high speed operations.

It is an object of the present invention to provide a new and improved die actuator of the character described which is out of the way during the time of nonuses of rest and which is capable of rapid actuation with a minimum of impact forces resulting so as to minimize the stress and strain on the die and the actuator, and thereby providing an extremely long and useful operating life without requiring maintenance or downtime on the machine.

Another object of the present invention is to provide a new and improved die actuator of the character described which is adapted to drop away, out of the way, after providing the necessary die closing action at the right time during the operating cycle of an automatic screw machine.

The foregoing and other objects and advantages of the present invention are accomplished in an illustrated embodiment comprising a new and improved die actuator for actuating the operating lever of a threading die mounted on an automatic screw machine. The screw machine includes a plural-sided turrethead which is movable toward and away from a workpiece and which is indexed to sequentially align the tools mounted on the head in work positions. The die actuator includes a base fixedly secured to the bed of the screw machine away from the workpiece and defining a guide supporting a vertical slide member movable between an elevated upper position and a lower, rest position out of the way of the other tools on the turrethead. Lift means extending laterally outwardly of the slide is provided for engagement with a die operating lever as the turret is indexed and the lever moves on an upward travel path. This engagement moves the lever and lifts the slide causing the threading die to close with the thread chasers in a thread cutting position ready for threading operation. Subsequently, the turrethead is indexed and moved toward and away from the workpiece. Upon forward travel after die closing, the die operating lever moves out from under the lift means permitting the slide to drop downwardly to the rest position out of the way of the tools on the turrethead until the next engagement with the die operating lever.

For a better understanding of the present invention, reference should be had to the following detailed description when taken in conjunction with the drawings, in which.

Figure 2:
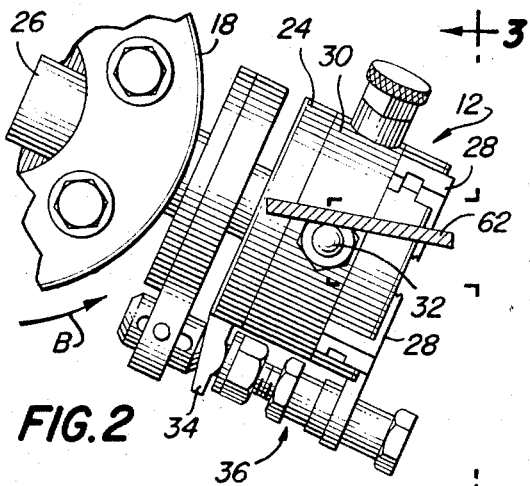
FIG. 2 is a fragmentary, side elevational view similar to FIG. 1 and illustrating the action of initial lifting engagement between the die operating lever of the threading die and the lift of the die actuator.
Figure 3:
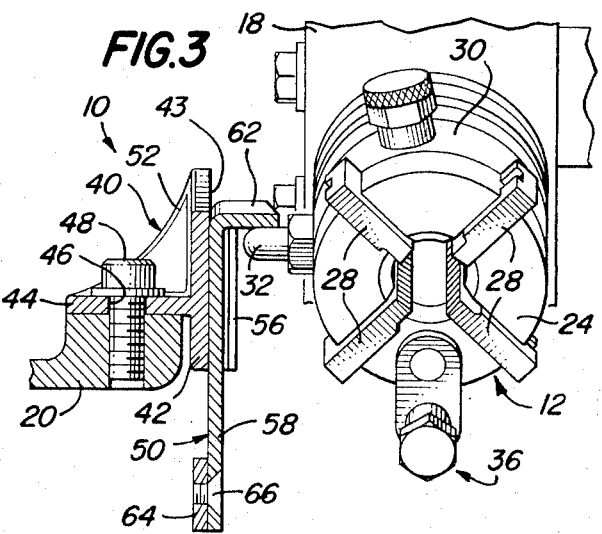
FIG. 3 is a transverse, cross-sectional view taken substantially along line 3—3 of FIG. 2.
Figure 4:
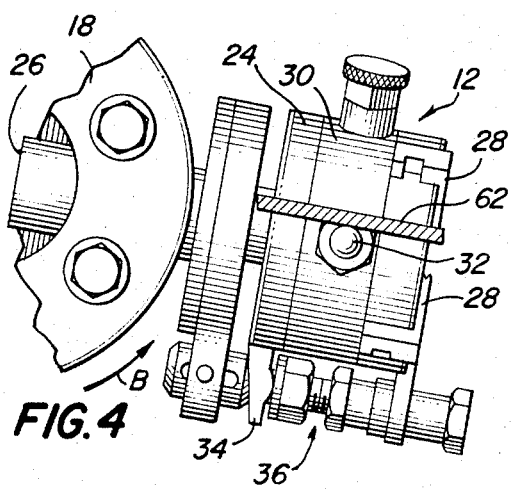
Figure 5:
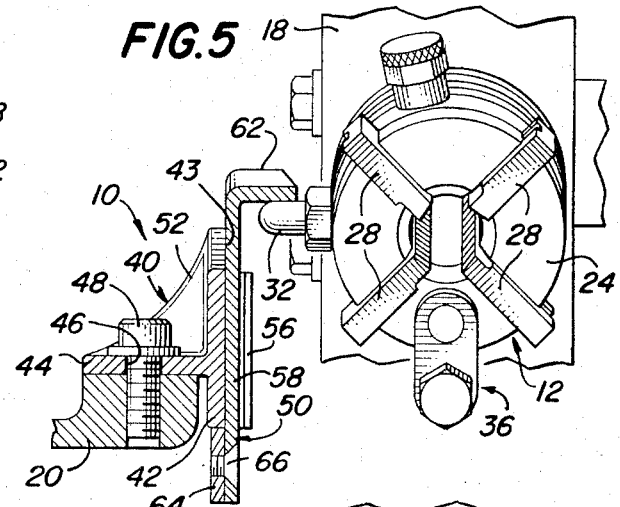
Figure 6:
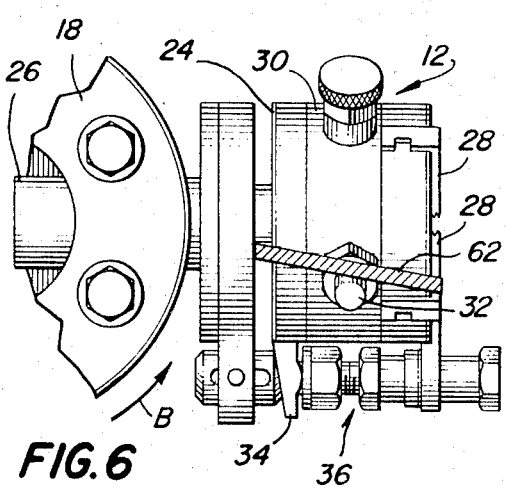
Figure 7:
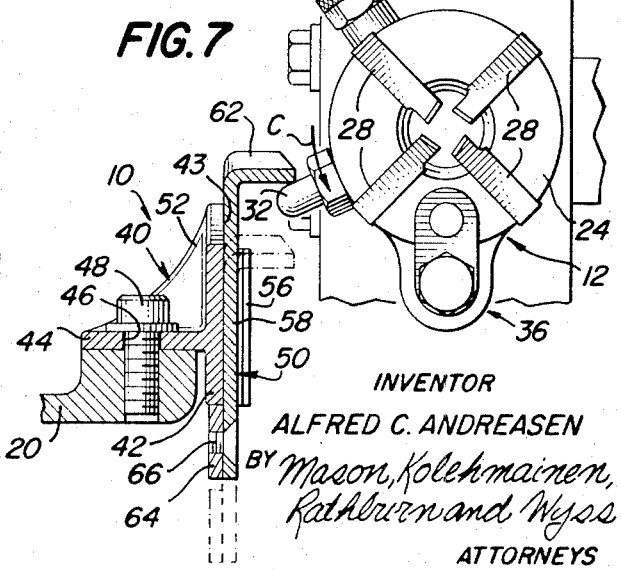

FIGS. 4 and 6 are fragmentary side elevational views similar to FIG. 2 showing subsequent relative positions of the die operating lever and die actuator FIGS. 5 and 7 are transverse, cross-sectional views similar to FIG. 3 but pertaining to FIGS. 4 and 6, respectively;

FIG. 8 is a top plan view looking downwardly on the die operating lever and die actuator while engaged in the relative positions illustrated in FIGS. 6 and 7; and FIG. 9 is an exploded, perspective view of the die actuator constructed in accordance with the features of the present invention.

Referring now, more particularly, to the drawings, therein is illustrated a new and improved die actuator or die closer mechanism 10 constructed in accordance with the features of the present invention and especially adapted for use with an automatic, self-opening, threading die 12 which is adapted to cut threads on a workpiece 14. The die closer 10 is fixedly positioned on an automatic screw machine which includes a collet 16 for holding and rotating the workpiece 14 relative to the threading die 12 when the die is indexed and moved into a thread cutting position. The threading die 12 is supported adjacent one side face or index position on a multipositionable or indexable turrethead 18, which is rotatively indexed about an axis extending transversely of and intersecting a longitudinal axis aligned with the workpiece 14 in the automatic screw machine. The turret is indexed in sequence into a plurality of work positions wherein separate tools besides the threading die 12, which are mounted on the turret, are aligned and positioned to perform selected operations on the workpiece 14.

The die closer 10 is fixedly mounted on a bed 20 of the screw machine in fixed position remotely spaced from the collet 16 and area of cutting action on the workpiece 14. The collect 16 is carried on a drive head assembly generally indicated as 22 in FIG. 1 and can be tightened, released, and rotated to provide the desired action for the workpiece. The turrethead 18 is mounted for reciprocal sliding movement in a direction parallel of the longitudinal axis of the workpiece 14 between a forward or work position, indicated in dotted lines in FIG. 1, and a rearward or indexing position shown in solid lines, wherein the tools carried thereby are out of operative engagement with the workpiece. Sequential controlled indexing of the turrethead about the transverse axis and longitudinal reciprocation of the turrethead toward and away from the workpiece are controlled in a well-known manner by the control system of the automatic screw machine. Typical of machines having this capability is the Brown & Sharpe No. 2 "Automatic" manufactured by the Machine Tool Division of Brown & Sharpe Mfg. Co., of Providence, Rhode Island. In machines of this type, indexing action is usually accomplished while the turrethead is toward the rear to avoid contact between the various tools carried by the turrethead and the workpiece.

Figure 1:
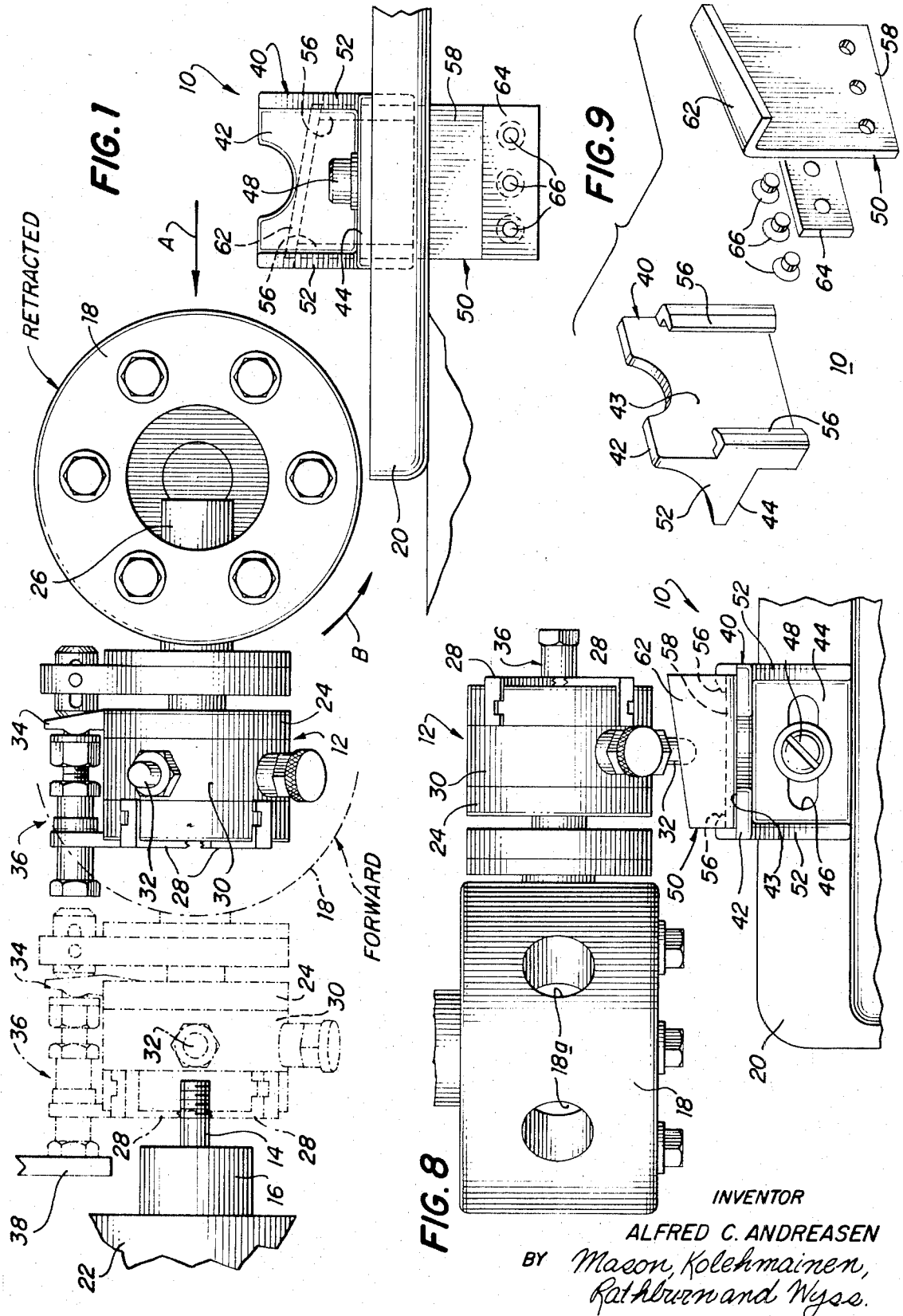
FIG. 1 is a fragmentary, somewhat schematic, side elevational view of an automatic screw machine provided with a threading die and a new and improved die actuator constructed in accordance with the features of the present invention.

In accordance with the present invention, the automatic thread cutting die 12 is of the self-opening type, such as a style "DSA — Geometric Convertible" manufactured by the Geometric Tool Company, 1 Valley Street, New Haven, Connecticut 06515. Threading dies of this type have a generally cylindrical body 24 which is supported from an aligning shank and base structure 26 adapted to be received in one of several tool support bores 18a provided in the turrethead 18. As best shown in FIGS. 3, 5, and 7, the cylindrical die body is provided with a plurality of radially outwardly extending slots on the forward face which intersect an axial center bore for receiving the workpiece being threaded. A plurality of radially movable die chasers 28 are slidably mounted in the slots for movement between an outward or die open position (as illustrated in FIGS. 3 and 5) and an inward or operative die closed, cutting position, as shown in FIG. 7. The thread chasers 28 have cutting teeth on the inside edges thereof for engaging the workpiece 14 and cutting threads thereon upon relative rotation between the die and the workpiece. The thread chasers 28 move in unison inwardly and outwardly and are interconnected by a rotary cam member 30 which is carried on the cylindrical body 24 intermediate the front and back faces. The cam 30 is rotatable on the body 24 through an angle of approximately 20 to 30 degrees, to effect opening and closing of the die and is normally biased to the die open position by an internal spring (not shown). Movement of the cam 30 to close the die is accomplished by means of a radially outwardly extending die operating lever or handle 32 having a rounded outer end. The lever or handle 32 is engageable with the die actuator 10 of the present invention to rotate the cam 30 to close the normally open die. Once the die is closed by rotation of the cam ring 30 relative to the cylindrical body 24, the closed position is retained by means of an internal, spring biased, lock pin (not shown). The lock pin is releasable to open the die by movement of a release lever 34, which then permits the bias spring to open the chasers 28 to the fully open position. As best shown in FIG. 1, after the thread chasers 28 are moved to the closed position in the die body ready for cutting threads, the turrethead 18 is indexed until the die is axially aligned with and facing the workpiece. The closed die is then moved towards the workpiece 14 in the direction of arrow "A," and as the workpiece 14 is rotated by the collet 16, threads are cut for the desired length, at which time the adjustable release assembly 36 engages a stop 38 fixedly mounted on the automatic screw machine. When the stop is engaged, the release pin assembly activates the lever 34 to pivot from the locked position (as shown in dotted lines in FIG. 1) to the released position (as shown in dotted lines), and as this occurs the internal locking pin is released and the internal spring inside the die 12 causes the die chasers 28 to move outwardly to the open position. After opening of the die, the turrethead 18 is moved rearwardly in a direction opposite the arrow "A" and subsequent indexing steps and work steps are accomplished.

As viewed in FIG. 1, indexing of the turrethead 18 takes place in discrete, angular increments in a counterclockwise direction as indicated by the rotary arrow "B," and the turrethead may have any number of operative index positions, limited by the space available and the number and type of tools required to perform the particular milling, machining, boring, drilling, etc., operations on the workpiece 14 being manufactured.

In accordance with the present invention, the new and improved die closer 10 is especially designed and adapted for automatically closing the die 12 in readiness for a subsequent threading operation. The combination of the die and closer is especially designed for long and useful service life because of greatly reduced impact or operating forces applied or transmitted between threading die and the die actuator, even when operated at high speeds and production rates (for example, 225 cycles or workpieces per hour with 10 different tool operations per cycle). Moreover, the die actuator or closer 10, in accordance with the present invention, is especially adapted to drop out of the way and clear of all of the tools when further indexing action of the turrethead 18 is undertaken. The die actuator 10 includes a base member 40 having an upstanding guide 42 and an integrally laterally outwardly extending mounting lug 44, which is slotted, as at 46 (FIG. 8) in order to receive a cap screw 48 for securing the base in place on the bed 20 of the automatic screw machine. In order to strengthen the base, gussets 52 of generally triangular shape are provided between the guide and lug and preferably the base structure is formed by casting or molding of suitable high strength material, such as cast steel, and the like. The upstanding guide 42 includes a smooth, planar guide surface 43 for accurately guiding the vertical sliding movement of a reciprocal slide member 50 having a depending vertical tang portion 58 and a lifter or lip 62 formed at right angles at the upper end, as best shown in FIG. 9. In order to provide transverse guidance for the slide 50 to insure only truly vertical sliding action, the guide 42 is formed with a pair of vertical side flanges 56 along opposite edges of the guide face 43, and the flanges provide slots for receiving opposite edges of the slide, as shown in FIG. 8.

The slide 50 is disposed for vertical sliding movement relative to the fixed base 40 between an upper or die operating, engaged position, shown in FIGS. 4, 5, 6, and 7, and a downward or lower rest position as shown in FIGS. 1 and 3 dropped away from interference with the other tools on the turret. Upward travel of the slide 50 is limited by means of a stop member 64 attached to the lower end of the tang 58 of the slide by suitable fasteners, such as rivets or countersunk head cap screws 66. Engagement between the upper surface of the stop member 64 and the lower end of the upstanding guide 42 on the base 40 eliminates further upward travel. As best shown in FIG. 1, the lift flange 62 extends inwardly toward the turrethead for direct lifting engagement by the die operating lever 32 as the turrethead 18 is indexed to the 3 o'clock position by rotation in the direction of the arrow "B." The lifter 62 is inclined forwardly and upwardly at an angle of approximately 10 degrees to the horizontal so that as the turrethead 18 moves forward toward the workpiece in the direction of the arrow "A," the slide 50 is gradually lowered toward the rest position at a relatively slow full rate. When the die operating lever 32 moves far enough forwardly to pass the forward edge of the lifter 62, the slide 50 is then permitted to drop away to the rest position wherein the lifter is completely out of the way.

As shown in FIGS. 2 and 3, when the turrethead 18 is indexed in a counterclockwise direction (as shown by the arrow "B") from a work position, wherein the die 12 is about at a 5 o'clock position, toward the 3 o'clock position, wherein the die is directly opposite the workpiece 14, the initial upward travel of the die during the indexing action causes the die operating lever 32 to engage and lift the lifter 62 on the slide 50 upwardly on the base 40 toward the elevated position. This initial engagement is shown in FIGS. 2 and 3 wherein the engaging components are moving together with the slide 50. As the indexing continues, the slide 50 is lifted further upwardly until the stop 64 engages the lower end of the guide 42 on the actuator base 40. When this occurs, further continued indexing of the turret 18, as shown in FIGS. 6 and 7, causes the die operating lever 32 to rotate relatively around the axis of the die body 24 causing the cam ring 30 to move through approximately 20–30 degrees, as indicated by the arrow "C" in FIG. 7. Movement of the cam ring causes the die to close and moves the thread chasers 28 inwardly from the open position of FIG. 5 to the closed position of FIG. 7, ready for cutting threads. Once the die has been closed by this action, it remains closed until released and the chasers 28 are retained in the closed position until the die opening release mechanism 36 is activated, as previously described, by engagement with the stop 38. When this indexing step of the turrethead 18 has been completed, the turrethead is then moved forwardly in the direction of the arrow "A" so that the tool directly opposite the threading die 12 on the head can perform operations upon the workpiece 14.

Upon forward movement of the turrethead with the threading die 12 closed, the die operating lever 32 gradually permits the slide 50 to lower, because of the inclined angle of the lifter 62, as previously described. When the die operating lever 32 moves forwardly of the forward edge of the lifter 62, the slide is then permitted to drop downwardly away and into the downward or rest position, as shown in FIGS. 1, 2, and 3. In this position, the lifter 62 is completely out of the way of the tools carried on the turrethead 18. The slide 50 remains in the downward or rest position until the next indexing sequence in the successive cycle of operation wherein the threading die 12 is again indexed into the three o'clock position directly opposite the workpiece.

As before described, after the threads have been cut on the workpiece 14 by the closed die 12 and subsequent contact between the release mechanism 36 and the stop 38 occurs, the release lever 34 is pivoted, as shown in dotted lines (FIG. 1), to release or open the die and the internal spring causes the cam 30 to rotate relative to the cylindrical body 24 and move the thread chasers 28 outwardly to the open position where they remain until closing action occurs, as described, by engagement of the die operator 32 with the lifter 62 of the die actuator 10. After closing action by the die actuator, as described, the turret 18 is indexed several times before the threading die is in position to cut threads on the workpiece 14. However, the die remains closed during this interval because of the internal locking pin action within the die itself.

From the foregoing, it will be seen that the die actuator 10 cooperates with the threading die to provide the automatic die closing feature and with a minimum of stress or strain applied to the relatively moving parts. Accordingly, the die actuator is capable of extremely long life without excessive maintenance, and wear and tear on the threading die 12 are also minimized. Moreover, no springs or spring members are deflected and, accordingly, many cycles of operation are accomplished without appreciable metal fatigue.

While there has been illustrated and described one embodiment of the present invention, it will be appreciated that numerous changes and modifications will occur to those skilled in the art, and it is intended in the appended claims to cover all those changes and modifications which fall within the true sprit and scope of the present invention.

What is claimed as new and desired to be secured by Letters Patent of the United States is:

1. A die actuator for moving the operator of a threading die mounted on the tool supporting head of an automatic screw machine wherein said head is movable toward and away from a workpiece in an axially aligned direction and is indexed in a plurality of different work positions about an index axis laterally transverse of said axial direction, said actuator comprising a base adapted to be rigidly secured to said machine and defining vertical guide means, an actuator slide mounted for vertical sliding movement on said base in engagement with said guide means between an elevated position and a lower rest position, and lift means extending outwardly of said slide into the upward path of travel of said die operator for slideably lifting said slide on said base when said head is indexed to a different work position while away from said workpiece, said lift means dimensioned to become disengaged from said die operator after closing said die upon travel of said head toward said workpiece.

2. The die actuator of claim 1 wherein said lift means is engageable with said guide means to limit downward travel thereof upon dropping out of engagement with said die operator toward said rest position.

3. The die actuator of claim 1 including stop means cooperating with said guide means for limiting the upward movement of said lift means while engaged and lifted by said die operator during indexing of said head and engagement of said lift means by said die operator.

4. The die actuator of claim 1 wherein said lift means is sloped upwardly toward said workpiece for lowering said slide toward said rest position on forward travel of said head.

5. The die actuator of claim 4 wherein said lift means is tapered from a maximum width away from said slide and workpiece to a minimum width away from said slide toward said workpiece.

6. The actuator of claim 3 wherein said stop means limits upward travel of the outer end of said die operator before a selected indexing step of said head is completed, thereby causing relative movement between said die operator and said threading die during completion of said selected step.

* * * * *